US005499610A

United States Patent [19]
Bruner et al.

[11] Patent Number: 5,499,610
[45] Date of Patent: Mar. 19, 1996

[54] PLURAL RECEPTACLE FILTERING LITTER BOX SYSTEM

[76] Inventors: Dennis R. Bruner; Donna L. Batagianis, both of 122 W. 10th St., Michigan City, Ind. 46360

[21] Appl. No.: 357,852

[22] Filed: Dec. 16, 1994

[51] Int. Cl.$^6$ ................................................. A01K 1/035
[52] U.S. Cl. ........................... 119/166; 119/165; 209/374
[58] Field of Search ................................. 119/166, 167, 119/165; 209/359, 374, 408

[56] References Cited

U.S. PATENT DOCUMENTS

| | | | |
|---|---|---|---|
| 2,183,773 | 12/1939 | Lehman | 209/374 |
| 4,030,449 | 6/1977 | Ruddick et al. | 119/166 |
| 4,505,226 | 3/1985 | Carlson | 119/166 |
| 5,211,133 | 5/1993 | Foley | 119/166 |
| 5,365,883 | 11/1994 | Laviolette | 119/170 |
| 5,625,815 | 7/1994 | Gumpesberger | 119/166 |

FOREIGN PATENT DOCUMENTS 2934811  3/1983  Germany ................. 119/166

*Primary Examiner*—Todd E. Manahan

[57] ABSTRACT

A system for retaining and filtering animal litter. The inventive device includes a plurality of nested receptacles for containing the litter. A screen insert is removably positioned within a corner of the receptacle to permit filtering of the litter during pouring thereof into another receptacle. A cover assembly is coupled to an uppermost one of the receptacles to preclude projection of litter therefrom by a pet.

11 Claims, 4 Drawing Sheets

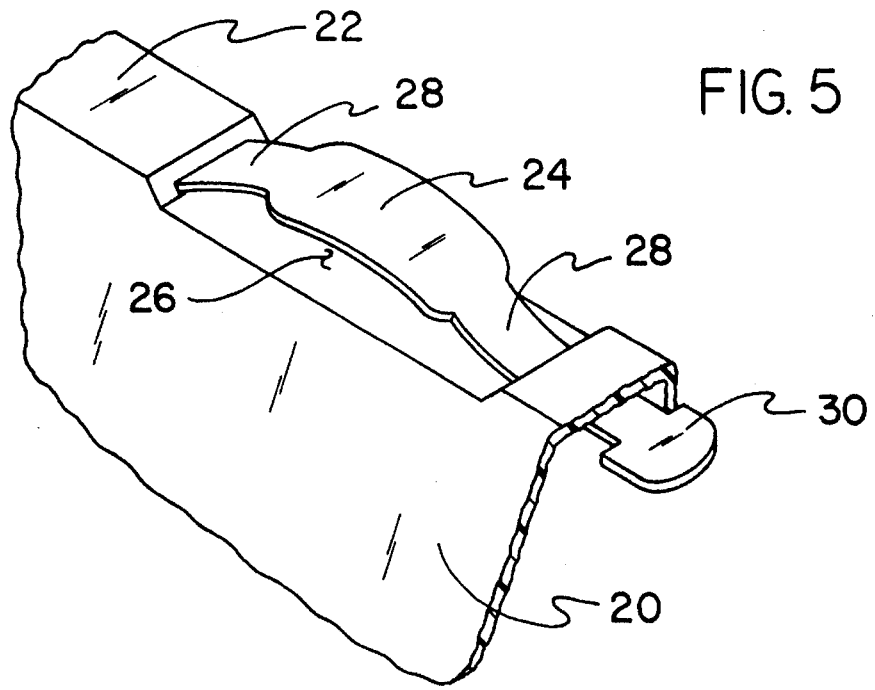
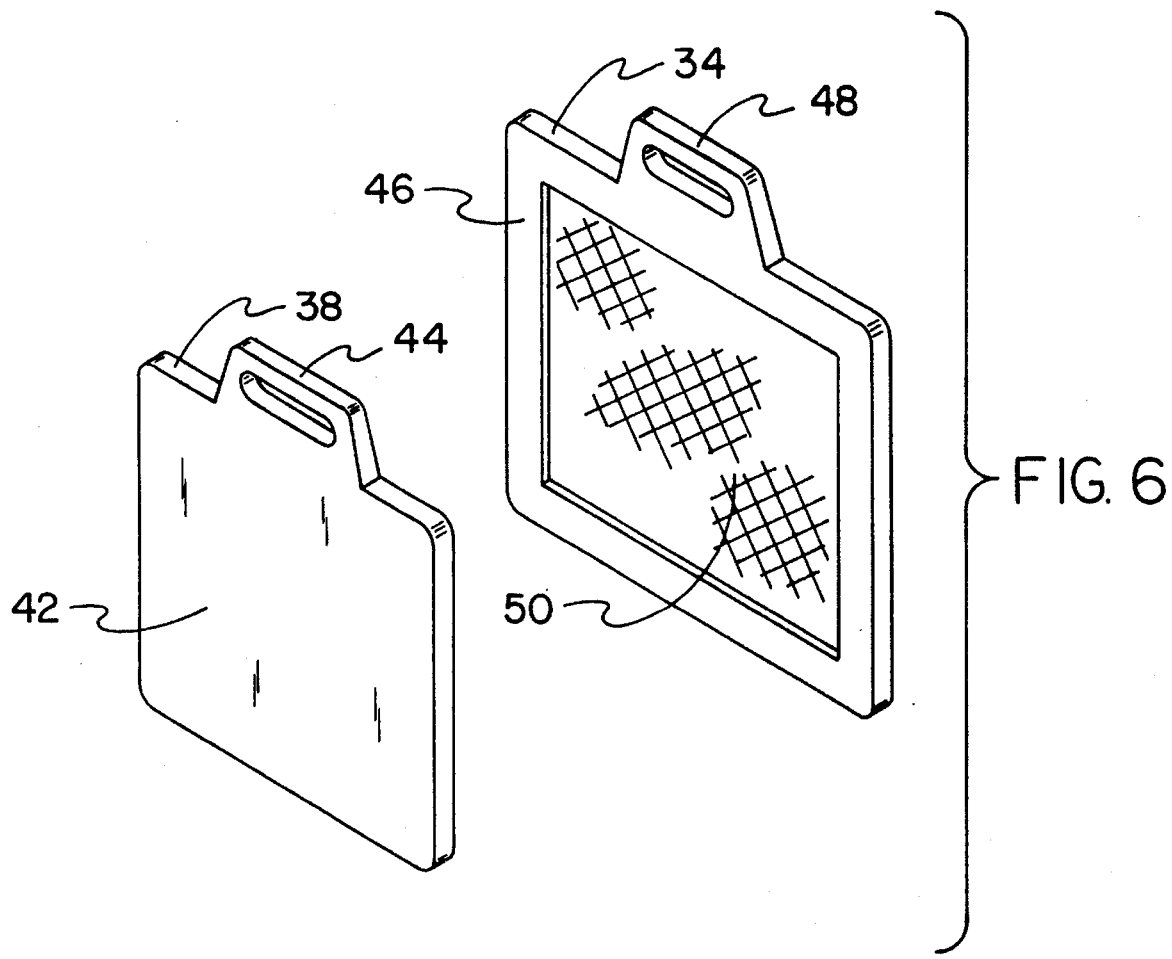

PLURAL RECEPTACLE FILTERING LITTER BOX SYSTEM

BACKGROUND OF THE INVENTION

1. Field of the Invention

The present invention relates to container structures and more particularly pertains to a plural receptacle litter box system for retaining and filtering animal litter.

2. Description of the Prior Art

The use of container structures is known in the prior art. More specifically, container structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art container structures include U.S. Pat. Nos. 5,272,999; U.S. Pat. 5,259,340; U.S. Pat. 5,220,885; U.S. Pat. 5,167,204; and U.S. Pat. Design No. 331,990.

While these devices fulfill their respective, particular objectives and requirements, the aforementioned patents do not disclose a plural receptacle litter box system for retaining and filtering animal litter which includes a plurality of nested receptacles, a screen insert removably positioned within a corner of one of the receptacles to permit filtering during pouring thereof into another receptacle, and a cover assembly coupled to an uppermost one of the receptacles to preclude projection of litter therefrom by a pet.

In these respects, the plural receptacle litter box system according to the present invention substantially departs from the conventional concepts and designs of the prior art, and in so doing provides an apparatus primarily developed for the purpose of retaining and filtering animal litter.

SUMMARY OF THE INVENTION

In view of the foregoing disadvantages inherent in the known types of container structures now present in the prior art, the present invention provides a new plural receptacle litter box system construction wherein the same can be utilized for retaining and filtering animal litter. As such, the general purpose of the present invention, which will be described subsequently in greater detail, is to provide a new plural receptacle litter box system apparatus and method which has many of the advantages of the container structures mentioned heretofore and many novel features that result in a plural receptacle litter box system which is not anticipated, rendered obvious, suggested, or even implied by any of the prior art container structures, either alone or in any combination thereof.

To attain this, the present invention generally comprises a system for retaining and filtering animal litter. The inventive device includes a plurality of nested receptacles for containing the litter. A screen insert is removably positioned within a corner of the receptacle to permit filtering of the litter during pouring thereof into another receptacle. A cover assembly is coupled to an uppermost one of the receptacles to preclude projection of litter therefrom by a pet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new plural receptacle litter box system apparatus and method which has many of the advantages of the container structures mentioned heretofore and many novel features that result in a plural receptacle litter box system which is not anticipated, rendered obvious, suggested, or even implied by any of the prior art container structures, either alone or in any combination thereof.

It is another object of the present invention to provide a new plural receptacle litter box system which may be easily and efficiently manufactured and marketed.

It is a further object of the present invention to provide a new plural receptacle litter box system which is of a durable and reliable construction.

An even further object of the present invention is to provide a new plural receptacle litter box system which is susceptible of a low cost of manufacture with regard to both materials and labor, and which accordingly is then susceptible of low prices of sale to the consuming public, thereby making such plural receptacle litter box systems economically available to the buying public.

Still yet another object of the present invention is to provide a new plural receptacle litter box system which provides in the apparatuses and methods of the prior art some of the advantages thereof, while simultaneously overcoming some of the disadvantages normally associated therewith.

Still another object of the present invention is to provide a new plural receptacle litter box system for retaining and filtering animal litter.

Yet another object of the present invention is to provide a new plural receptacle litter box system which includes a plurality of nested receptacles, a screen insert removably positioned within a corner of one of the receptacles to permit filtering during pouring thereof into another receptacle, and a cover assembly coupled to an uppermost one of the receptacles to preclude projection of litter therefrom by a pet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an enlarged isometric illustration of a portion of the invention.

FIG. 6 is an isometric illustration of further portions of the invention.

DESCRIPTION OF THE PREFERRED EMBODIMENT

Figure 1:
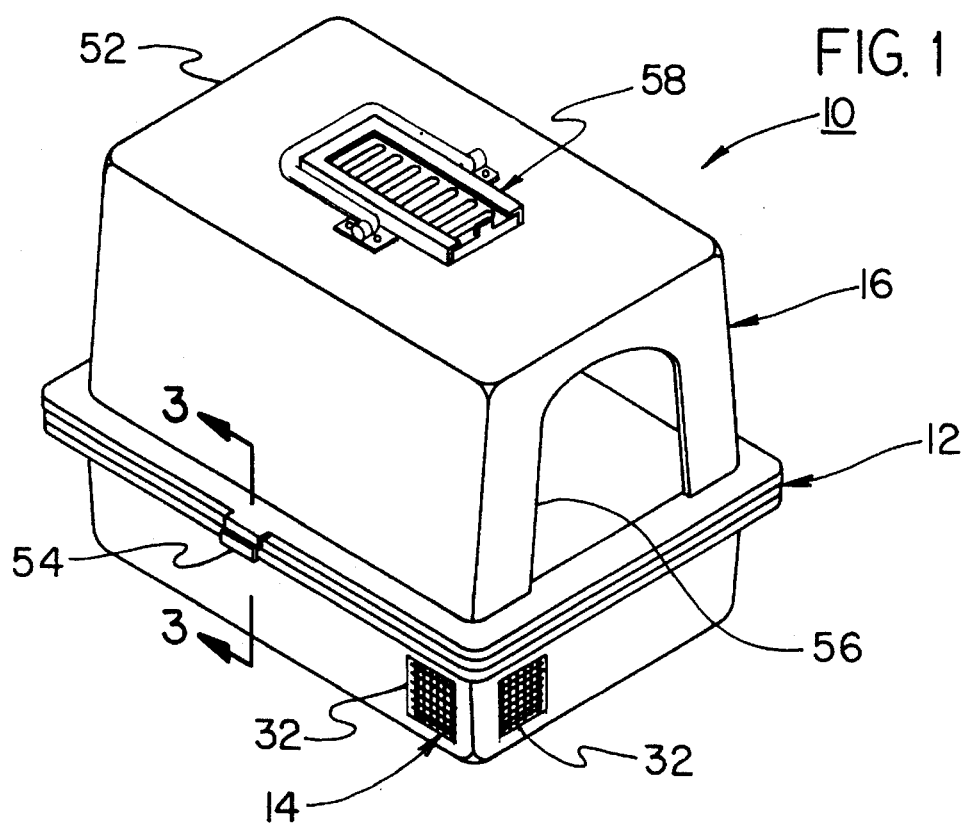
FIG. 1 is an isometric illustration of a plural receptacle litter box system according to the present invention.

With reference now to the drawings, and in particular to FIG. 1-8 thereof, a new plural receptacle litter box system embodying the principles and concepts of the present invention and generally designated by the reference numeral 10 will be described.

Figure 3:
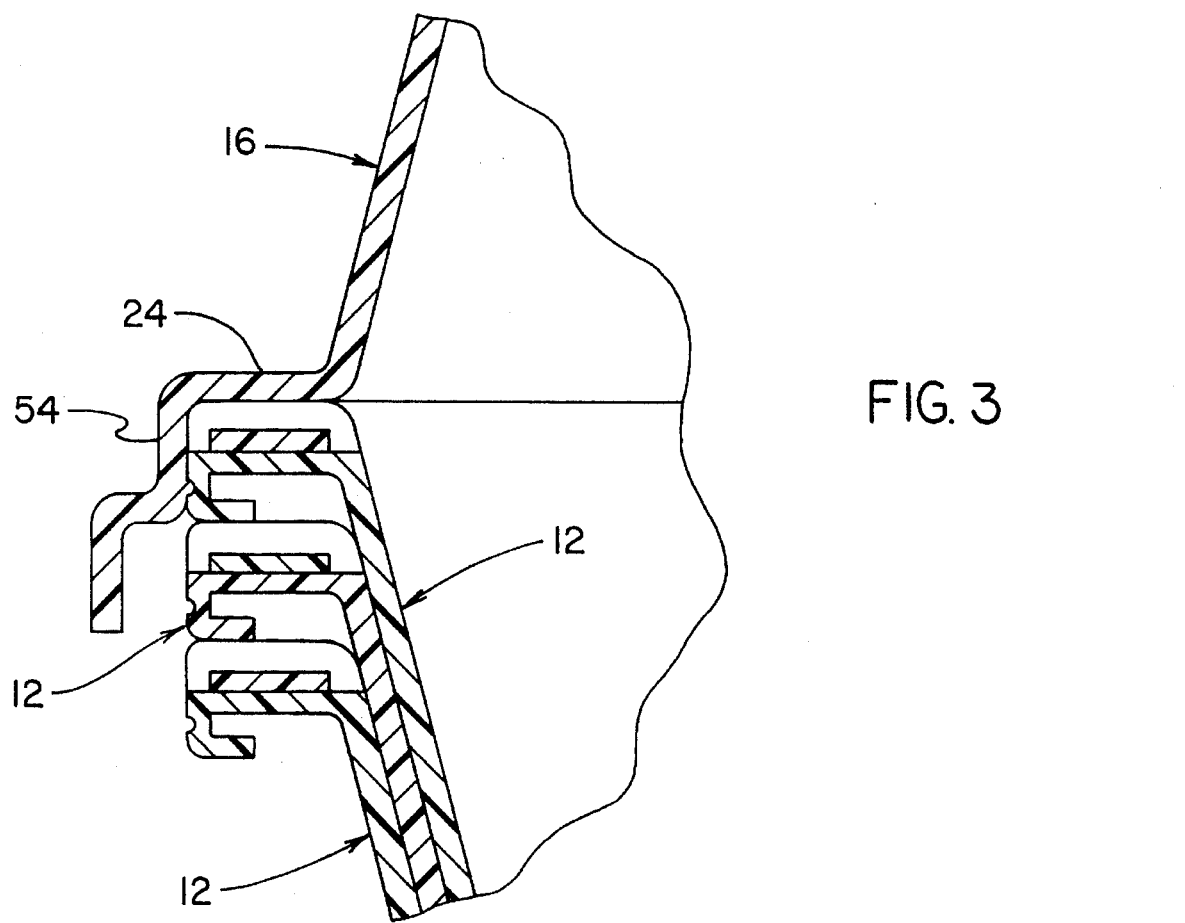
FIG. 3 is a cross sectional view taken along line 3—3 of FIG. 1.

More specifically, it will be noted that the plural receptacle litter box system 10 comprises a plurality of substantially similarly constructed receptacles 12 which can be nested one inside of the other, as shown in FIG. 1 and the cross sectional illustration of FIG. 3. A filter means 14 is coupled to each of the receptacles 12 for dispensing and filtering animal litter from an individual one of the receptacles into another one of the receptacles during a litter cleaning procedure. A cover means 16 may additionally be provided and coupled to an uppermost one of the receptacles 12 for precluding projection of litter from the uppermost one of the receptacles.

As best illustrated in FIGS. 2 through 5, it can be shown that each of the receptacles 12 includes a substantially rectangular bottom wall 18 circumscribed by an upwardly projecting side wall 20. The side wall 20 projects from the bottom wall 18 at an oblique angle relative thereto so as to permit a nesting positioning of the receptacles 12 together as shown in FIG. 3 wherein three such receptacles are illustrated in a nested orientation. The side wall 20 terminates at an upper edge thereof in a projecting flange 22 extending outwardly from the side wall and into a substantially parallel orientation relative to the bottom wall 18. By this structure, a plurality of the receptacles 12 can be nested together, with the uppermost one of the receptacles receiving a volume of animal litter for use by an associated and unillustrated pet.

To permit manual manipulation of each of the receptacles 12, the receptacles may be provided with collapsible handles 24 which are coupled to opposed sides of the projecting flange 22. As shown in FIG. 5, each of the collapsible handles 24 is positioned within a recess 26 formed within the projecting flange 22 and includes oppositely projecting extension webs 28 directed through unlabelled apertures in the projecting flange 22. The extension webs 28 each terminate in an enlarged end portion 30 permitting the handle 24 to be extended from the projecting flange 22 as desired while simultaneously precluding a separation of the extension webs 28 from the apertures of the projecting flange 22. By this structure, the handles 24 can be utilized to manipulate an individual receptacle 12 to effect dispensing and filtering of the litter contained therein through the filter means 14.

Figure 2:
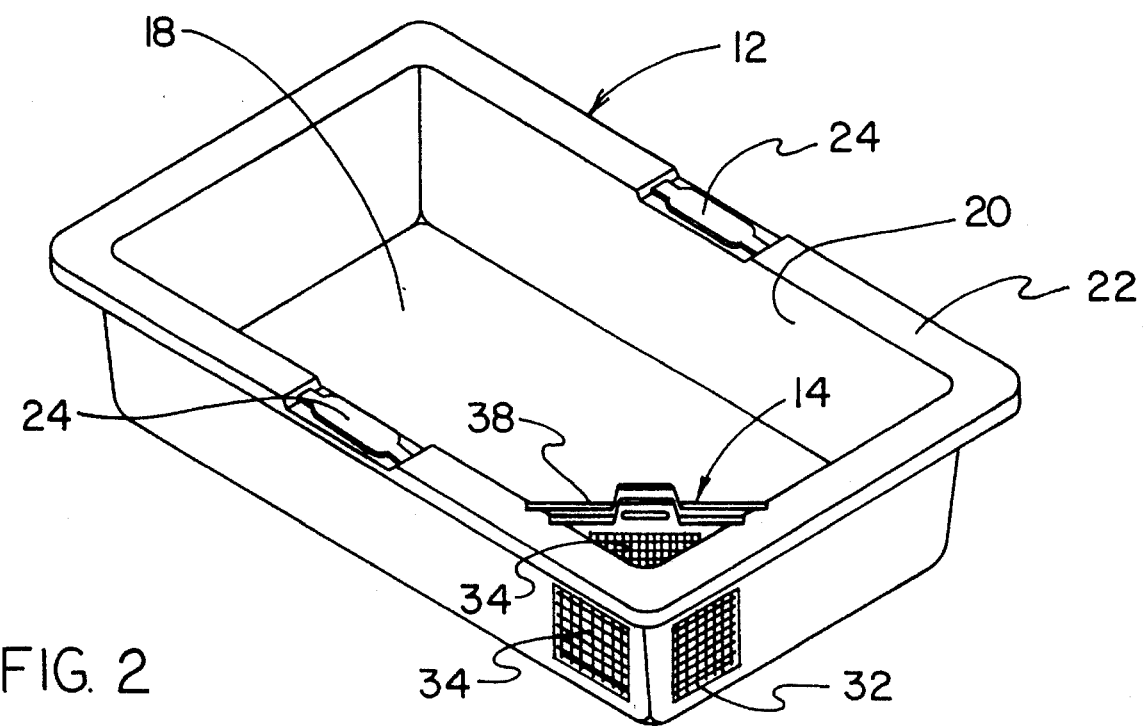
FIG. 2 is an isometric illustration of an individual receptacle of the invention.
Figure 4:
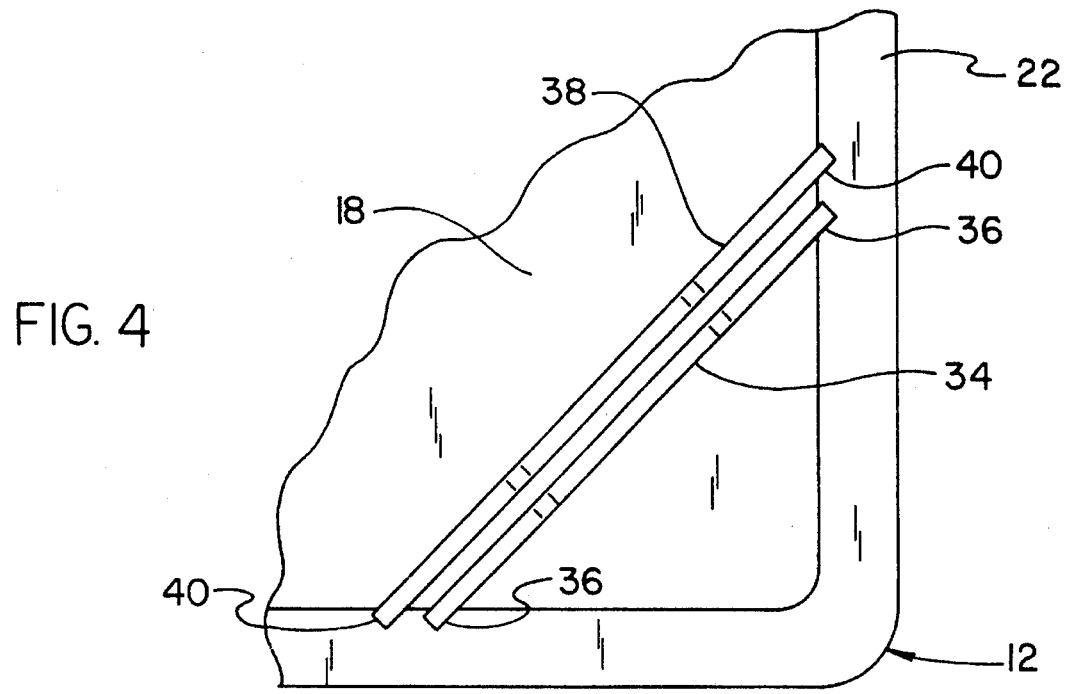
FIG. 4 is an enlarge top plan view of a portion of the present invention.

As shown in FIGS. 2, 4 and 6, it can be shown that the filter means 14 according to the present invention 10 preferably comprises at least one and preferably a pair of screen panels 32 positioned over unlabelled apertures in the side wall 20 which permit a passage of the litter material therethrough while simultaneously filtering such litter material to retain any solid waste products within the associated receptacle. Preferably, the screen panels 32 are located proximal to a corner of the receptacle 12 so as to permit ease of pouring of the associated litter material. As shown in FIG. 4, the filter means 14 further comprises a screen insert 34 removably positioned within a first pair of angled channels 36 formed in the side wall 20 of the receptacle 12. Similarly, a solid insert 38 is removably received within a second pair of angled channels 40 so as to extend across the corner of the receptacle 12 proximal to the screen panels 32. The screen insert 34 is thus positioned between the solid insert 38 and the portion of the side wall 20 where the screen panels 32 are secured. By this structure, the solid insert 38 precludes a passage of the litter material through the screen insert 34 or either of the screen panels 32. However, when it is desirable to clean the volume of litter contained within the uppermost one of the receptacles 12, the solid insert 38 can be selectively removed from the second pair of angled channels 40, whereby a tilting and pouring of the litter material towards the corner of the receptacle 12 will cause the litter material to filter through the screen insert 34 and subsequently through the screen panels 32, whereby large solids present within the litter material will be retained within the receptacle. Preferably, the screen insert 34 is of a coarse grade for initially filtering large objects from the litter material, with the screen panels 32 being of a fine grade so as to filter smaller objects from the litter material. Thus, the screen insert 34 cooperates with the screen panels 32 to filter both large and small objects from the litter material.

As shown in FIG. 6, the solid insert 38 preferably comprises a solid panel 42 of substantially planar configuration shaped so as to define a solid insert handle 44 for permitting manual manipulation of the solid insert. The screen insert 34, as shown in FIG. 6, comprises a substantially rectangular frame 46 shaped so as to define a screen insert handle 48 permitting manual manipulation of the screen insert 34. A screen web 50 extends across the frame 46 so as to initially filter the animal litter as described above.

As shown in FIG. 1, the cover means 16 according to the present invention 10 preferably comprises a substantially rectangular hood enclosure 52 having opposed clip members 54 which facilitate coupling of the hood enclosure to an uppermost one of the receptacles 12, as clearly illustrated in FIG. 3. The hood enclosure 52 is shaped so as to define an entrance aperture 56 permitting ingress and egress into the hood enclosure and associated uppermost one of the receptacles 12. Preferably, the cover means 16 additionally includes a vent means 58 for filtering air passing through unlabelled apertures in the hood enclosure.

Figure 7:
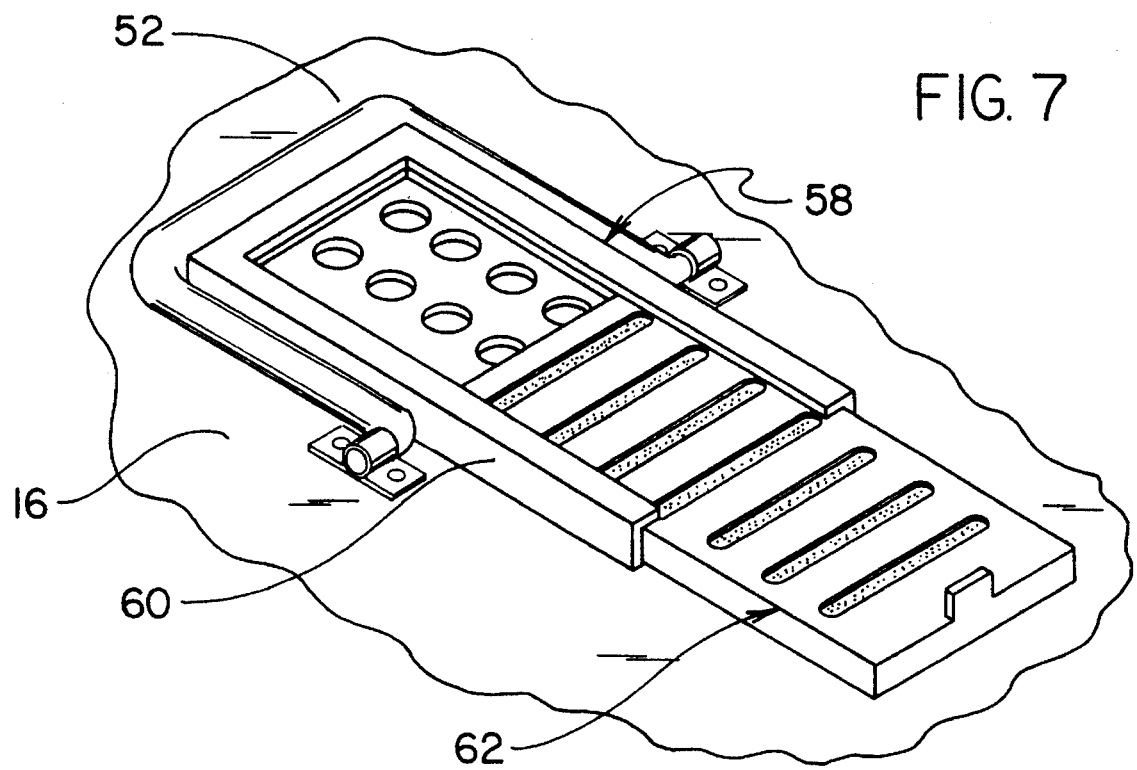
FIG. 7 is an enlarged isometric illustration of a vent means comprising a portion of the present invention.
Figure 8:
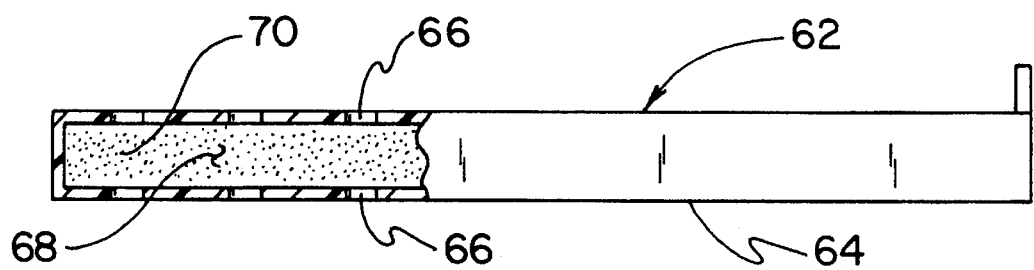
FIG. 8 is a side elevation view, partially in cross section, of a portion of the vent means.

As shown in FIGS. 7 and 8, the vent means 58 according to the present invention 10 preferably comprises a receiving frame 60 mounted along an uppermost portion of the hood enclosure 52 over the plurality of apertures extending therethrough. A cartridge 62 is removably received within the receiving frame 60 and operates to filter and deodorize the air passing through the vent apertures. As shown in FIG. 8, the cartridge 62 preferably comprises a rectangular housing 64 having a plurality of vent apertures 66 directed through both upper and lower portion of the rectangular housing. The rectangular housing 64 defines an interior compartment 68 within which a deodorizing substance such as charcoal 70 is positioned, whereby air passing through the vent apertures 66 is deodorized and/or disinfected.

In use, the plural receptacle litter box system 10 according to the present invention can be easily utilized to contain and maintain a volume of litter in a clean condition through the method of filtering described above utilizing the filter means 14. To this end, the volume of litter contained within an uppermost one of the receptacles 12 can be filtered by the filter means 14 through a removal of the solid insert 38 and a subsequent pouring of the volume of litter material through the screen insert 34 and the screen panels 32 into a lowermost one of the receptacles 12. The retained solids within the receptacle 12 from which the litter was poured can thus be disposed of properly separate from the litter material. The receptacle 12 from which the litter was poured can then be nested beneath the receptacle into which the filtered litter was poured. Such procedure can be repeated on a periodic basis to continue filtering of the litter material until such material has been thoroughly used.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plural receptacle litter box system comprising:

a plurality of nested receptacles; and, filter means coupled to each of the receptacles for dispensing and filtering animal litter from an individual one of the receptacles into another one of the receptacles during a litter cleaning procedure;

wherein each of the receptacles includes a substantially rectangular bottom wall circumscribed by an upwardly projecting side wall;

wherein the side wall is shaped so as to define corners, with an aperture directed through the side wall proximal to a first corner thereof, and further wherein the filter means comprises a screen panel positioned over the aperture in the side wall to permit a passage of litter material therethrough while simultaneously filtering the litter material to retain solid waste products within the receptacle.

2. The plural receptacle litter box system of claim 1, wherein the side wall is shaped so as to define a first pair of angled channels proximal to the first corner thereof, and further wherein the filter means further comprises a screen insert removably positioned within the first pair of angled channels formed in the side wall of the receptacle.

3. The plural receptacle litter box system of claim 2, wherein the side wall is shaped so as to define a second pair of angled channels proximal to the first corner thereof, and further wherein the filter means further comprises a solid insert removably positioned within the second pair of angled channels formed in the side wall of the receptacle, wherein the screen insert is positioned between the solid insert and the first corner of the side wall.

4. The plural receptacle litter box system of claim 3, wherein the screen insert is of a coarse grade for initially filtering large objects from the litter material, with the screen panel being of a fine grade so as to filter smaller objects from the litter material.

5. The plural receptacle litter box system of claim 4, wherein the solid insert comprises a solid panel of substantially planar configuration shaped so as to define a solid insert handle for permitting manual manipulation of the solid insert, and further wherein the screen insert comprises a substantially rectangular frame shaped so as to define a screen insert handle permitting manual manipulation of the screen insert; and a screen web extending across the frame.

6. The plural receptacle litter box system of claim 5, wherein the side wall projects from the bottom wall at an oblique angle relative thereto so as to permit a nesting positioning of the receptacles together, the side wall terminating at an upper edge thereof in a projecting flange extending outwardly from the side wall and into a substantially parallel orientation relative to the bottom wall.

7. The plural receptacle litter box system of claim 6, and further comprising a pair of collapsible handles mounted to the flange of the receptacle, each of the collapsible handles including oppositely projecting extension webs directed through apertures in the projecting flange, the extension webs each terminating in an enlarged end portion permitting the handle to be extended from the projecting flange while simultaneously precluding a separation of the extension webs from the apertures of the projecting flange.

8. The plural receptacle litter box system of claim 7, and further comprising a cover means coupled to an uppermost one of the receptacles for precluding projection of litter from the uppermost one of the receptacles.

9. The plural receptacle litter box system of claim 8, wherein the cover means comprises a substantially rectangular hood enclosure having opposed clip members engaged to the uppermost one of the receptacles, the hood enclosure being shaped so as to define an entrance aperture extending therethrough.

10. The plural receptacle litter box system of claim 9, wherein the cover means further includes a vent means for filtering air passing through unlabelled apertures in the hood enclosure, the vent means comprising a receiving frame mounted along an uppermost portion of the hood enclosure over a plurality of apertures extending through the hood; and a cartridge means removably received within the receiving frame for filtering and deodorizing air passing through the vent apertures.

11. A litter box comprising:

a receptacle, the receptacle including a substantially rectangular bottom wall circumscribed by an upwardly projecting side wall, the side wall being shaped so as to define corners, with an aperture directed through the side wall proximal to a first corner thereof; and, filter means coupled to the receptacle for dispensing and filtering animal litter from the receptacle, the filter means comprising a screen panel positioned over the aperture in the side wall to permit a passage of litter material therethrough while simultaneously filtering the litter material to retain solid waste products within the receptacle.

* * * * *